Patented Mar. 9, 1954

2,671,844

UNITED STATES PATENT OFFICE 2,671,844

TIN SOLDER

Guenther W. Laubmeyer and Marius E. Smits, Kassel-Wilhelmshohe, Germany

No Drawing. Application July 26, 1951, Serial No. 238,766

3 Claims. (Cl. 219—12)

The present invention relates to a tin solder, more particular to a tin solder of the type to be used with electrical soldering tools.

Due to the development of the electrical industries during the past 30 years, the requirements for improvements in the art of soldering too have become more exacting; this refers, for instance, to radio equipment and metering devices of different kinds. Devices have recently been developed, among many others, more particularly in the field of hearing aids which, due to their intricate structure require the highest degree of accuracy in every soldered spot.

In all soldering operations the electrical soldering iron is provided with a soldering bit which is needed for transferring solder and transmitting heat onto the spot proper to be soldered; thus, this bit, apart from its being capable of alloying with the tin solder, should be of high thermal conductivity. In general, copper or alloys of high copper contents are used for that purpose.

The great number of minute soldered spots require that the shape of the edge of the soldering bit be exactly adjusted to fit them; during the soldering operation, however, the bit is subject to wear and it is, therefore, necessary to refinish it at more or less frequent intervals. The wear is not, by any means, mechanical but is caused by the loosening of copper which tends to form an alloy with the tin component of the tin solder.

The present invention is based on the discovery that the rate at which the copper becomes detached from the bit largely depends on the tin contents of the solder on the one hand, and on the copper contents gradually accumulating under certain conditions on the other hand. Measurements have shown that the rate at which copper becomes detached, decreases to about 10% when copper is present in the tin in an amount of about 5%. With an amount of only 3% of copper present, the rate of detachment drops to one quarter of the value existent with tin solder free from copper.

When soldering operations are carried out there will always occur a formation of copper and tin alloys in the soldered spot due to the detachment of copper from the bit. Experience has shown, however, that joints containing copper, added as it were, unintentionally, are perfectly adequate for practical purposes. Consequently, in work hitherto performed, the disadvantage is not the quality of the soldered joint but the rapid wear of the soldering bit.

It is the principal object of the present invention to overcome the above mentioned inconvenience of the rapid wear of the soldering bit.

It is a further object of the invention to provide means which permit to cut down to a minimum the necessity for frequent refinishing operations of the soldering bit.

Other objects and advantages of the present invention will be seen from the following specification.

Generally speaking, the invention relates to a tin solder of the tin-lead type which comprises a soldering component of a different metal of high thermal conductivity and capable to form an alloy with the main metals of said solder, and to transfer the solder onto the spot to be soldered.

Said soldering component replaces part of the solder body metals, and consists of the same metal of which the bit is formed.

As a rule, copper is used as a bit-forming metal and, consequently, according to a preferred embodiment of our invention, we use copper as an addition to the body alloy. The invention is, however, not limited to the use of copper.

As regards the amount of copper or other bit-forming metal to be added to the body alloy from the start, it varies with the particular requirements and may be as high as 10%. Very good results may, however, be obtained with considerably smaller amounts. In the case of copper it is, however, essential that an eutectic of tin and copper should form in the alloy. The eutectic, according to the diagram Sn–Cu, consists of 99% of Sn, 1% of Cu. It is thus necessary to add in any case such an amount of copper that the formation of the eutectic can be expected with certainty. Thus, with the commercial lead solder containing lead and tin in the ratio of 50/50, the minimum amount of copper to be added is 1% of the tin component or 0.5% of the total weight of the solder.

When the alloys according to the invention are used for making the tin solder, the wear of the soldering bit will drop to almost 10% and the useful life of the tool will, consequently, be increased almost ten times. The frequency of refinishing operations of the tool can be cut down accordingly.

As mentioned before, in some cases soldering bits may be used consisting of some other metals than copper but reacting with the tin in a similar way. In these cases, an appropriate addition of the metal in question should be made to the tin-lead alloy from the start. The actual amount of the metal to be added depends, among other things, on the amount of tin present in the alloy. Other features to be considered with regard to the amount of metal added are the change in properties of the soldered joint, such as corrosion resistance, hardness, extensibility, and resistance to oscillations, all of these properties being considered with the purpose of the particular work in view.

While we have described preferred embodiments of our invention it will be understood that we do not limit ourselves in any particulars.

Obviously, various modifications of our invention of the new tin solder may be made within the scope of the invention, as disclosed and claimed in the following claims. In the body of the solder, for instance, the basic components either tin or lead, or both of them may be replaced partially by other metals.

We claim:

1. In the manufacture of fine mechanical instruments, such as radio equipment, metering devices, hearing aids, comprising a large number of small soldered joints for electric connections, the method of making said soldered joints by using in combination an electrically heated soldering tool provided with a soldering bit, and a solder of the tin-lead type, said solder comprising an additional soldering component consisting of a metal of high thermal conductivity, forming an alloy with the main metals of said solder, said additional component consisting of the same metal of which the bit of said soldering tool is formed.

2. A solder for carrying out the method set forth in claim 1, consisting of tin, lead, and the metal of the soldering bit in an amount sufficient to form a eutectic.

3. In the manufacture of fine mechanical instruments, such as radio equipment, metering devices, and hearing aids, comprising a large number of small soldered joints for electrical connections, the method of making said soldered joints by using in combination an electrically heated soldering tool provided with a soldering bit comprising copper and a solder of the thin lead type, said solder comprising copper, besides the body alloy in an amount sufficient to form the Sn-Cu eutectic.

GUENTHER W. LAUBMEYER.
MARIUS E. SMITS.

References Cited in the file of this patent

UNITED STATES PATENTS

| Number | Name | Date |
|---|---|---|
| 93,137 | Taylor | July 27, 1869 |
| 1,239,195 | Lorentowicz | Sept. 4, 1917 |
| 1,429,959 | Melton | Sept. 26, 1922 |
| 2,220,961 | Kern | Nov. 12, 1940 |

FOREIGN PATENTS

| Number | Country | Date |
|---|---|---|
| 7,159 | Great Britain | May 30, 1891 |
| 149,918 | Switzerland | Dec. 16, 1931 |